United States Patent [19]

Allen

[11] 3,856,543
[45] Dec. 24, 1974

[54] CONTROLLING SETTING OF PLASTERS
[75] Inventor: Maurice Allen, Stockton-on-Tees, England
[73] Assignee: Imperial Chemical Industries Limited, London, England
[22] Filed: Oct. 25, 1973
[21] Appl. No.: 409,451

[30] Foreign Application Priority Data
Oct. 31, 1972   Great Britain .................... 50155/72

[52] U.S. Cl. .............................................. 106/110
[51] Int. Cl. .......................................... C04b 11/00
[58] Field of Search .................................... 106/110

[56] References Cited
UNITED STATES PATENTS
581,466   4/1897   Kleber ............................... 106/110

FOREIGN PATENTS OR APPLICATIONS
12,242   4/1896   Great Britain ...................... 106/110

Primary Examiner—Delbert E. Gantz
Assistant Examiner—John P. Sheeban
Attorney, Agent, or Firm—Cushman, Darby & Cushman

[57] ABSTRACT

The setting time of calcium sulphate hemihydrate castings is controlled by adding to the slurrying water a calcium compound which will react with sulphuric acid to form calcium sulphate, adding sulphuric acid to the mixture, allowing the calcium compound and acid to react partially, and during the reaction adding adding solid calcium sulphate hemihydrate to the aqueous mixture.

9 Claims, No Drawings

CONTROLLING SETTING OF PLASTERS

The present invention relates to control of the setting time of calcium sulphate hemihydrate plaster (stucco), whether derived from natural or by-product gypsum (from the production of phosphoric acid by the acidulation of phosphate rock with sulphuric acid), and particularly to a method for accelerating the set without the deleterious side-effects which can arise from presently known methods. Hemihydrate plasters have been investigated, described and used to such an extent that it is unnecessary to elaborate upon them here, except as a reminder that they vary enormously in their properties, e.g. their crystal-habit, their water-demand (W.D. — the minimum amount of water they require to produce a handleable hemihydrate/water mix), their purity, their setting-time, their suitability for specific purposes (wall-plasters, plasterboard, cast-gypsum blocks, etc.). Such properties depend, in turn, upon a large number of factors including, inter alia, the origin of the natural gypsum or phosphate rock, the method of producing phosphoric acid (in the case of by-product gypsum), the ratio of water to hemihydrate (W.R.) actually used in the hemihydrate/water mix (usually in excess of the water demand), etc. In casting processes in particular, the use of high water-to-hemihydrate ratios often leads to unacceptably long setting times. With all these (and many more) variables, it will be appreciated that the following description cannot provide absolute figures in respect of all plasters, but only for a number of representative samples from which a clear and remarkably consistent pattern emerges.

It is also common practice to include a setting-accelerator in the mix. Many such accelerators are known and have been used, but without exception they are open to one or more objections, not least that their accelerating effect is unpredictable, varying widely not only for hemihydrates of different origin but even for the same hemihydrate when slurried at different water ratios. Some soluble inorganic salts (particularly potassium sulphate, aluminium sulphate) are widely used but cause efflorescence in the finished block (possibly owing to the presence of the foreign potassium and aluminium cores therein) and render it unacceptable. Sulphuric acid produces an acidic block and may be responsible for a flash-set. The addition of gypsum, ground or otherwise, is a known method of accelerating sets but its effectiveness is extremely variable.

The present invention is for a method of controlling the setting-times of hemihydrate plasters which is not only free of the above-mentioned disadvantages but which also makes it possible to predetermine, within certain limits, what the setting times will be, and thus obtain the optimum output for any given casting plant. The invention arose out of tests which we were carrying out on the foaming of hemihydrate plaster with sulphuric acid and chalk. The setting was so fast that we attempted to slow it down with KERATIN retarder (a well-known retarder comprising a mixture of animal materials, such as horn, hoof, etc., with lime). To our surprise, and contrary to all expectations, the addition of KERATIN retarder only served to accelerate the set still further. We therefore carried out further tests, using VEBA KOLA by-product hemihydrate (water-demand 0.36) made up into a slurry with a water: hemihydrate ratio (WR) of 0.5 and containing 1% $H_2SO_4$.

Samples of this slurry alone, and with varying amounts of KERATIN, were poured into moulds and their initial setting times measured. The results are shown in Table 1 and are again contrary to expectation. As a well-known retarder, one would have expected the setting time to increase as the amount of KERATIN increased, but in fact the reverse occurred.

TABLE I

VEBA KOLA (0.36 WD) at 0.5 WR

| % $H_2SO_4$ | % KERATIN | Initial Set (Minutes) |
|---|---|---|
| 0.0 | 0.0 | 26½ |
| 1.0 | 0.05 | 21 |
| 1.0 | 0.10 | 15½ |
| 1.0 | 0.20 | 13 |
| 1.0 | 0.50 | 9½ |
| 1.0 | 1.0 | 6 |

Knowing that KERATIN contains lime, (itself a well-known retarder), we decided to repeat these tests using varying quantities of $H_2SO_4$ and $Ca(OH)_2$ or $CaCO_3$ in place of the KERATIN. The results, shown in Table II, are very similar to those of Table I, and illustrate the very considerable acceleration of setting time which can be obtained by casting a hemihydrate slurry containing $H_2SO_4$ and $Ca(OH)_2$, or $H_2SO_4$ and $CaCO_3$. Table II demonstrates that the hemihydrate can be caused to set at any preselected time by using predetermined quantities of the acid and of the calcium compound.

TABLE II

VEBA KOLA (0.36 WD) at 0.5 WR

| % $H_2SO_4$ | % $CaCO_3$ | % $Ca(OH)_2$ | Initial Set (Mins.) |
|---|---|---|---|
| 0.1 | 0.1 | NIL | 14 |
| 0.2 | 0.2 | do. | 8 |
| 0.5 | 0.5 | do. | 7 |
| 0.7 | 0.7 | do. | 7 |
| 1.0 | 1.0 | do. | 5 |
| 0.1 | NIL | 0.1 | 12 |
| 0.2 | do. | 0.2 | 9½ |
| 0.5 | do. | 0.5 | 8 |
| 0.7 | do. | 0.7 | 5¼ |
| 1.0 | do. | 1.0 | 5½ |

It is thought that this accelerating effect is obtained by virtue of the instantaneous formation in situ in the slurry of a large number of evenly-distributed particles of freshly hydrated gypsum, as a result of the reaction of the $H_2SO_4$ with the $Ca(OH)_2$ or $CaCO_3$, which particles are in a maximum reactive state and act as nuclei for the hydration and setting of the hemihydrate.

A particular advantage of accelerating the set with $H_2SO_4$ and $Ca(OH)_2$ or $CaCO_3$ is that these additives react to form exactly the same substance as the hemihydrate, namely gypsum. Since foreign ions are not introduced into the hemihydrate, efflorescence does not occur (unlike the case where a soluble inorganic salt such as potassium sulphate is used).

Three points to be noted are:
1. A mixture of lime and chalk may be used in place of lime alone or chalk alone.
2. Although it is preferred to use substantially equimolecular quantities of acid and lime or chalk, it is permissable for one or other of them to be present in slight excess, so that the finished block contains a slight residue thereof. What is important, however, is that neither of them should be present in an amount less than that required to give the preselected setting time.
3. Although it is preferred to use lime or chalk, any calcium compound (e.g. the chloride or nitrate) which reacts with sulphuric acid to produce calcium sulphate may be used instead.

Further tests were carried out using the following types of hemihydrate under the following conditions:
A. Israeli, WD 0.45, WR 0.7 { with 0.1 to 0.5% $H_2SO_4$ { and 0.1 to 0.5% $Ca(OH)_2$.
B. Israeli, W.D. 0.45, WR 1.0
C. Israeli, W.D. 0.55, WR 0.55 to 1.0, with 0.1 to 1.0% $H_2SO_4$ and 0.1 to 1.0% $Ca(OH)_2$.
D. Lebanon, WD 0.48, WR 0.48 to 1.0, with 0.1 to 0.7% $H_2SO_4$ and 0.1 to 0.7% $Ca(OH)_2$.
E. Israeli WD 0.45, Veba Kola WD 0.70, Morocco WD 0.82, Rikkihappo Kola WD 0.58, all at WR = WD, and with:
  a. 0.3% $H_2SO_4$ and 0.3% $Ca(OH)_2$
  b. 0.7% $H_2SO_4$ and 0.7% $Ca(OH)_2$
  c. 0.3% $H_2SO_4$ and 0.3% $CaCO_3$
  d. 0.7% $H_2SO_4$ and 0.7% $CaCO_3$ All these tests confirmed the accelerating effect of sulphuric acid with lime or chalk already shown in Tables I and II above.

While carrying out the tests A above, using hemihydrate derived from Israeli by-product gypsum with water demand 0.45 and slurried at a water ratio of 0.7, castings containing no additive, $H_2SO_4$ and/or $K_2SO_4$ were also made, and the crushing strengths of all the castings were measured. The results are given in Table III, and show that, in addition to its other advantages, the use of sulphuric acid with lime provides an additional bonus in the form of enhanced crushing strength as compared with the other accelerators tested.

TABLE III

Source Israeli gypsum, water demand 0.45, water ratio 0.7

| Accelerator % | | crushing strength psi |
|---|---|---|
| Nil | | 925 |
| do. | | 955 |
| 0.25 | $K_2SO_4$ | 1020 |
| 0.5 | do. | 955 |
| 1.0 | do. | 915 |
| 1.5 | do. | 880 |
| 2.0 | do. | 960 |
| 2.0 | $H_2SO_4$ | 720 |
| 5.0 | do. | 61 |
| 0.1 | $H_2SO_4/K_2SO_4$ | 900 |
| | do. | 1160 |
| 0.5 | $Ca(OH)_2/H_2SO_4$ | 1460 |
| 0.5 | do. | 1500 |
| 0.2 | do. | 1345 |
| 0.2 | do. | 1290 |

It has previously been proposed (in the so-called "Prayon" method) to mix a calcium compound, such as CaO, $Ca(OH)_2$, $CaCO_3$, which will react with sulphuric acid to form calcium sulphate, with ground α-hemihydrate, preferably 1% by weight expressed as CaO. The mixture is then added to water and slurried, and finally dilute sulphuric acid is added and the whole is vigorously agitated. About one minute after the stucco addition the slurry is poured into moulds.

We have now found that this method can be improved upon (in the sense that the initial and final setting times of castings are reduced and their crushing strengths increased and, furthermore, in that it is unnecessary to grind the hemihydrate) if the calcium compound and the acid are first allowed to react together (e.g. for about 30 to 60 seconds) before the hemihydrate is mixed therewith. This pre-mixing of the calcium compound and acid gives rise to highly-reactive nascent gypsum which has a more marked accelerating effect than, for example, ground gypsum which is a known accelerator. (The method of the present invention is hereinafter referred to as the "nascent gypsum" method).

The present invention accordingly provides a method of controlling the setting time of calcium sulphate hemihydrate and a preselected quantity of water, which comprises the steps of intimately mixing with part of the water at least one calcium compound adapted to react with sulphuric acid to form calcium sulphate, intimately mixing sulphuric acid with the calcium compound and water mixture, allowing the sulphuric acid and calcium compound partially to react, and during the reaction intimately mixing solid calcium sulphate hemihydrate with the reacting mixture, the total amount of water in the final mixture being equal to the said preselected quantity of water. If desired the calcium compound and acid may be added substantially simultaneously, but it is preferred to add the acid after the calcium compound and water are thoroughly mixed.

The following tests were carried out using a hemihydrate (i.e. stucco) derived from Israeli by-product gypsum (WD 0.45):
1. Prayon method
100 g α-hemihydrate mixed with 1 g $Ca(OH)_2$. Add 70 ml $H_2O$ and mix vigorously for 30 seconds. At 45 seconds add 10 ml, 100 g/l, $H_2SO_4$, and mix vigorously for 15 seconds. Pour into moulds and test (a) for set times and (b) for cube strength.
(2) Prayon Stoichiometric method
Repeat with 1g $Ca(OH)_2$ and stoichiometric equivalent $H_2SO_4$, i.e., 1.35 g 98%; make slurry as before with 70 ml $H_2O$, but add 1.35 g conc. $H_2SO_4$ (0.725 ml) diluted to 10 ml.
Repeat both above but at WR 1.0; ie. make slurry with 90 ml $H_2O$.
3. Comparison with ground gypsum accelerator
Cast hemihydrate at WR 0.8, with 2.0% ground gypsum added after 45 seconds from start of addition of stucco to water. Mix for further 15 seconds and pour into moulds. Repeat for WR 1.0.
4. Nascent gypsum method
Add 1g $Ca(OH)_2$ to 70 ml $H_2O$ and mix thoroughly for 30 seconds.
Add 0.725 ml conc. sulphuric acid, diluted to 10 ml and mix for 1 minute.
Add 100g hemihydrate, mix for 1 minute and pour. Repeat at WR 1.0.
5. Comparison with sulphuric acid accelerator
Repeat (3) above using 1% $H_2SO_4$ instead of 2% gypsum. Acid added 45 seconds from start of addition of stucco to water. Mixing continued for further 75 seconds before pouring into moulds.
6. No accelerator
Cast hemihydrate at WR 0.8 and 1.0, pouring into moulds at 2 to 10 minutes from start of addition of stucco to water.

The results of these tests are summarised in Table IV and shown in greater detail in Table V. (In the latter Table, the stucco is shown as being added at zero time, i.e. 0 seconds, and the lime and acid shown as being added a certain number of seconds earlier, e.g., −30 seconds, −90 seconds, etc.)

The tests (4) above were repeated, using calcium nitrate, calcium chloride and calcium hydroxide, all in amounts equivalent to 1 gm. $Ca(OH)_2$. These results are also shown in Table V.

The nascent gypsum method of the present invention was also used on a hemihydrate derived from Landplaster gypsum, and the results of these tests are also shown in Table V.

Generally speaking, the results in respect of tests (4) above show that the calcium compound and acid are allowed to react for about 60 to 75 seconds before the hemihydrate is added, but about 15 seconds latitude, in either direction, will still give acceptable results.

TABLE IV

Acceleration of α-hemihydrate (Average of Results)
Source Material: Israeli by product gypsum

| | Initial set Din (Minutes) | Initial set Vicat (Minutes) | Final set Vicat (Minutes) | Crushing strength (psi) | Density |
|---|---|---|---|---|---|
| Water ratio 0.8 | | | | | |
| No accelerator | 17 | 33 | 60 | 1050 | 1.04 |
| Prayon Method | 9½ | 23½ | 43 | 950 | 1.02 |
| Prayon (stoichiometric) | 4¾ | 7½ | 13 | 1250 | 1.05 |
| Gypsum (ground) | 7¼ | 17½ | 35 | 1150 | 1.03 |
| $H_2SO_4$ | 4¾ | 7¾ | 11¼ | 1225 | 1.03 |
| Nascent gypsum method | 2¼ | 5 | 9¼ | 1390 | 1.05 |
| Water ratio 1.0 | | | | | |
| No accelerator | 25 | 51 | 83 | 600 | 0.90 |
| Prayon method | 15½ | 40 | 70 | 550 | 0.88 |
| Prayon (stoichiometric) | 6 | 11 | 17 | 820 | 0.90 |
| Gypsum (ground) | 16½ | 28½ | 61 | 650 | 0.89 |
| $H_2SO_4$ | 5½ | 9¾ | 15 | 875 | 0.90 |
| Nascent gypsum method | 3¾ | 8½ | 13¾ | 820 | 0.90 |

TABLE V

| Method | WR | Time Lime & Stucco Added | Time Acid Added | Time Poured into moulds | Initial Set Din | Initial Set Vicat | Final Set Vicat | Crushing Strength (psi) |
|---|---|---|---|---|---|---|---|---|
| Prayon | 0.8 | 0 | 45 sec | 1 min | 10 min | 25 min | 44 min | 930 |
| Prayon (Stoich) | 0.8 | 0 | 45 sec | 1 min | 5 min | 8¼ do. | 14 min | 1215 |
| Prayon | 1.0 | 0 | 45 sec | 1½ do. | 18 min | 44 min | 75 min | 566 |
| Prayon (stoich) | 1.0 | 0 | 45 sec | 1½ do. | 6 min | 11 min | 17 min | 820 |

| Method | WR | Time Lime Added | Time Acid Added | Time Stucco Added | Time Ground Gypsum Added | Initial Set Din | Initial Set Vicat | Final Set Vicat | Crushing Strength (psi) |
|---|---|---|---|---|---|---|---|---|---|
| Ground Gypsum | 0.8 | | | 0 | 45 sec | 1 min | 7½ min | 17 min | 36 min | 1090 |
| Ground Gypsum | 1.0 | | | 0 | 45 sec | 2 min | 16 min | 30 min | 64 min | 630 |
| Nascent Gypsum | 0.8 | −90 sec | −60 sec | 0 | | 1 min | 2¼ min | 5 min | 9¼ min | 1390 |
| Nascent Gypsum | 1.0 | −90 sec | −60 sec | 0 | | 1 min | 4 min | 8½ min | 13¾ min | 820 |
| No Accelerator | 0.8 | | | 0 | | 3 min | 18 min | 33 min | 62 min | 1120 |
| No Accelerator | 1.0 | | | 0 | | 2 min | 28 min | 60 min | >90 min | 542 |
| Repeat | 1.0 | | | 0 | | 10 min | 22 min | 42 min | 73 min | 626 |
| 1% Acid | 0.8 | | | 0 | 45 sec | 2 min | 4¾ min | 7¾ min | 11 min | 1230 |
| 1% Acid | 1.0 | | | 0 | 45 Sec | 2 min | 5½ min | 9¾ min | 15 min | 875 |

| Method | WR | Plaster | Calcium Additive | Time Acid Added | Time Lime Added | Time Stucco Added | Time Poured | Initial Set Din (min) | Initial Set Vicat (min) | Final Set Vicat (min) | Crushing strength (psi) |
|---|---|---|---|---|---|---|---|---|---|---|---|
| Nascent gypsum | 0.8 | Israeli | Calcium Nitrate $Ca(NO_3)_2.4H_2O$ | −60 sec | −90 secs | 0 | 1 | 3¾ | 8¼ | 14½ | 1450 |
| do. | 1.0 | do. | do. | do. | do. | 0 | 1 | 6 | 11½ | 17½ | 1010 |
| do. | 0.8 | do. | Calcium Chloride $CaCl_2.2H_2O$ | do. | do. | 0 | 1 | 4¼ | 9 | 14 | 1500 |
| do. | 1.0 | do. | do. | do. | do. | 0 | 1 | 5 | 12 | 16 | 915 |
| Blank | 0.8 | Landplaster | | | | 0 | 2 | 7 | 11½ | 14 | 1490 |
| Blank | 1.0 | do. | | | | 0 | 3 | 8 | 13½ | 17½ | 1000 |
| Nascent gypsum | 0.8 | do. | 0.1% $Ca(OH)_2$ | −60 sec | −90 secs | 0 | 1 | 5 | 10 | 13½ | 1915 |
| do. | 1.0 | do. | do. | do. | do. | 0 | 2 | 6 | 12¼ | 16½ | 1048 |
| do. | 0.8 | do. | 0.2% $Ca(OH)_2$ | do. | do. | 0 | 1 | 4¼ | 9¾ | 13½ | 1595 |
| do. | 1.0 | do. | do. | do. | do. | 0 | 2 | 5 | 11¾ | 17 | 980 |
| do. | 0.8 | do. | 0.5% $Ca(OH)_2$ | do. | do. | 0 | 1 | 4 | 9¼ | 13½ | 1550 |
| do. | 1.0 | do. | do. | do. | do. | 0 | 2 | 5 | 11 | 16½ | 970 |
| do. | 0.8 | do. | 1% $Ca(OH)_2$ | do. | do. | 0 | 1 | 3 | 5¾ | 9½ | 1380 |
| do. | 1.0 | do. | do. | do. | do. | 0 | 1½ | 3½ | 8 | 13 | 842 |

I claim:

1. Method of controlling the setting time of calcium sulphate hemihydrate and a preselected quantity of water, which comprises the steps of intimately mixing with part of the water at least one calcium compound adapted to react with sulphuric acid to form calcium sulphate, intimately mixing sulphuric acid with the calcium compound and water mixture, partially reacting the sulphuric acid and calcium compound, and then during said reaction intimately mixing solid calcium sulphate hemihydrate with the reacting mixture, the total amount of water in the final mixture being equal to the said preselected quantity of water.

2. Method as claimed in claim 1, wherein the calcium compound and the sulphuric acid are added in substantially stoichiometric amounts.

3. Method as claimed in claim 1, wherein the calcium compound is selected from the group consisting of calcium oxide, calcium hydroxide, calcium carbonate, calcium chloride and calcium nitrate.

4. Method as claimed in claim 1, wherein the hemihydrate is derived from byproduct gypsum from the manufacture of phosphoric acid.

5. Method as claimed in claim 1, wherein the hemihydrate is derived from natural gypsum.

6. Method as claimed in claim 1, wherein the hemihydrate is added between about 45 and 90 seconds after the acid has been added to the calcium compound and water mixture.

7. Method as claimed in claim 6, wherein the hemihydrate is added between about 60 and 75 seconds after the acid has been added to the calcium compound and water mixture.

8. Method as claimed in claim 1, wherein the acid is added substantially simultaneously with the lime.

9. Method as claimed in claim 1, wherein the acid is added after the calcium compound has been thoroughly mixed with the water.

* * * * *